US007263670B2

(12) United States Patent
Rekimoto

(10) Patent No.: US 7,263,670 B2
(45) Date of Patent: Aug. 28, 2007

(54) INFORMATION DISPLAYING METHOD, INFORMATION DISPLAYING DEVICE, AND COMPUTER PROGRAM

(75) Inventor: Junichi Rekimoto, Tokyo (JP)

(73) Assignee: Sony Corporation (JP)

( * ) Notice: Subject to any disclaimer, the term of this patent is extended or adjusted under 35 U.S.C. 154(b) by 624 days.

(21) Appl. No.: 10/865,324

(22) Filed: Jun. 10, 2004

(65) Prior Publication Data

US 2005/0060665 A1   Mar. 17, 2005

(30) Foreign Application Priority Data

Jun. 11, 2003   (JP)   ............................ P2003-165877

(51) Int. Cl.
*G06F 15/00* (2006.01)
*G06F 13/00* (2006.01)
(52) U.S. Cl. ...................... 715/837; 715/801; 715/764
(58) Field of Classification Search ................ 715/760, 715/763, 764, 765, 788, 798, 800, 801, 804, 715/836, 837, 838, 840
See application file for complete search history.

(56) References Cited

U.S. PATENT DOCUMENTS 6,426,761 B1 *   7/2002   Kanevsky et al. .......... 715/788
6,509,915 B2 *   1/2003   Berman et al. ............. 715/840
6,573,913 B1 *   6/2003   Butler et al. ................ 715/761

OTHER PUBLICATIONS

Perlin et al., "Pad-An Alternative Approach to the Computer Interface", Courant Institute of Mathemathical Sciences, Computer Graphics, vol. 27, 1993, pp. 57-64.
Bederson, et al., "Pat++: A Zooming Graphical Interface for Exploring Alternate Interface Physics", Proceedings of ACM UIST '94, ACM Press, Nov. 1994, pp. 17-26.
Sasaki, Yasushi, "It is Automatic Adjustment "Autosmall" v1.0 at Icon Size", date unknown.

* cited by examiner

*Primary Examiner*—Cao (Kevin) Nguyen
(74) *Attorney, Agent, or Firm*—Lerner, David, Littenberg, Krumholz & Mentlik, LLP

(57) ABSTRACT

In order to display all information to be displayed on a computer screen in a manner which is easy to understand in hierarchical window displaying, an entire screen is taken as a root window, and display objects of windows and icons corresponding to child windows of the root window are arranged on the root window. Lower order windows and icons are also present within the child windows. The sizes of the windows are user-programmable, and each window has its own independent scale. The scales are decided in such a manner that a proportion occupied by the total surface area of the display objects within a window is fixed or does not exceed a fixed value with respect to the surface area of the window.

24 Claims, 12 Drawing Sheets

FIG. 3
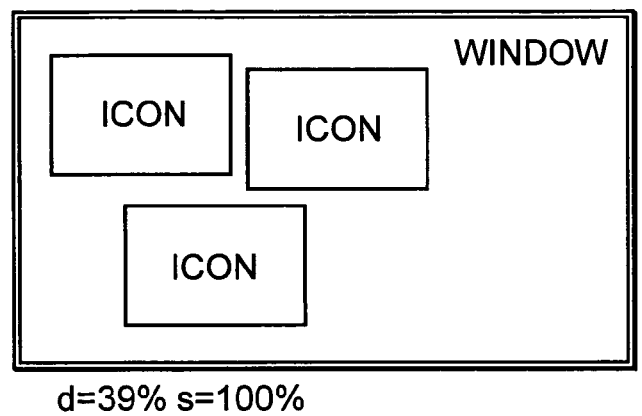
d=39% s=100%
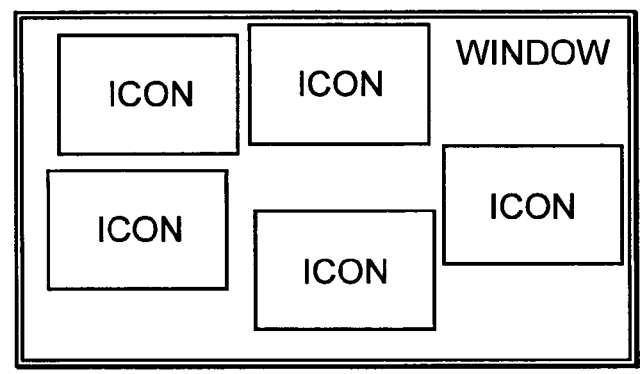
d=49% s=100%
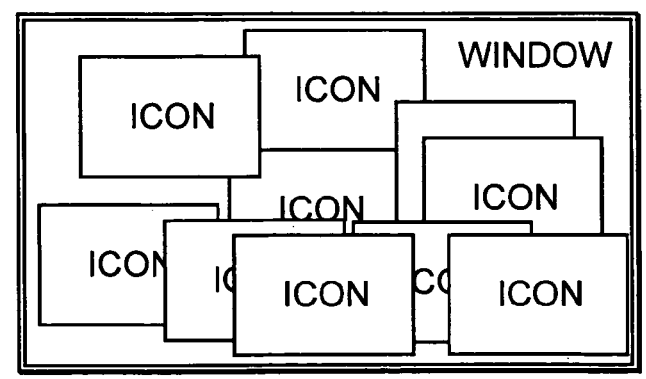
d=98% s=100%

FIG. 4
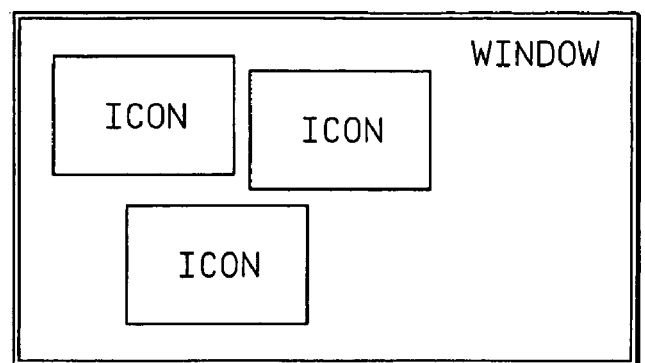
d=39% s=100%
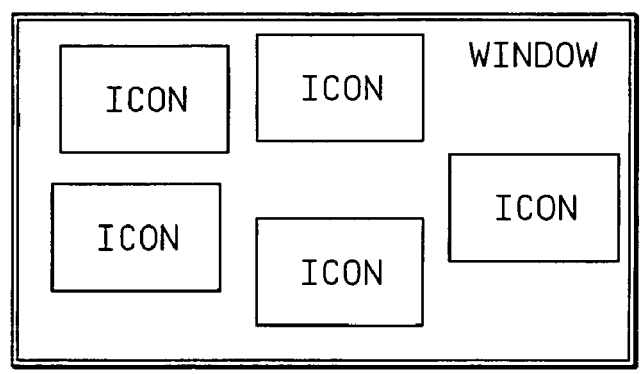
d=39% s=90%
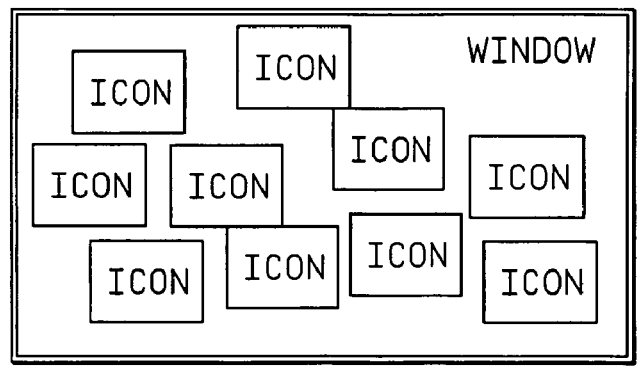
d=39% s=63%

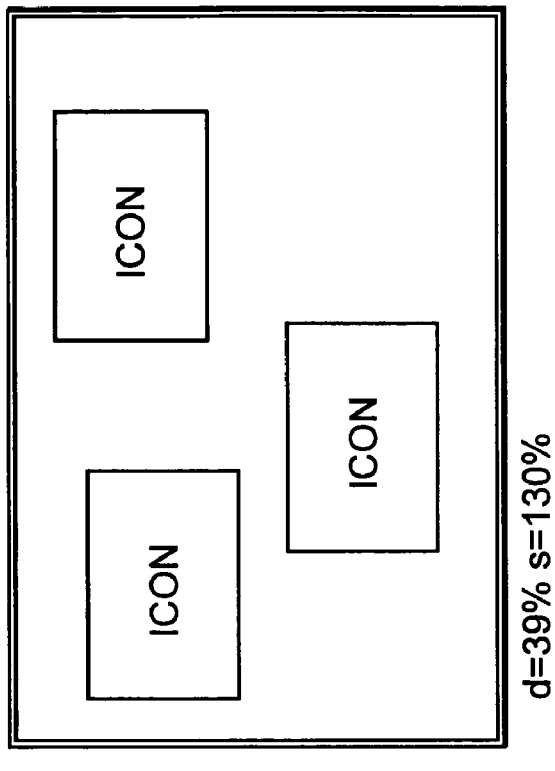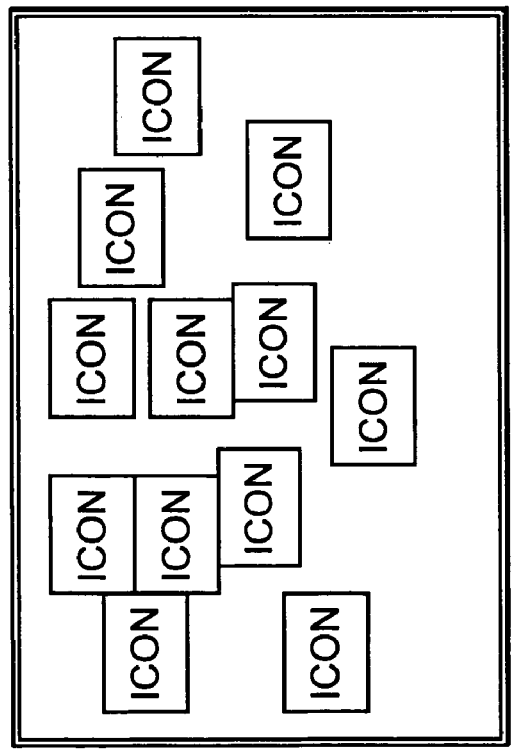
FIG. 5 d=39% s=76% d=40% s=73%

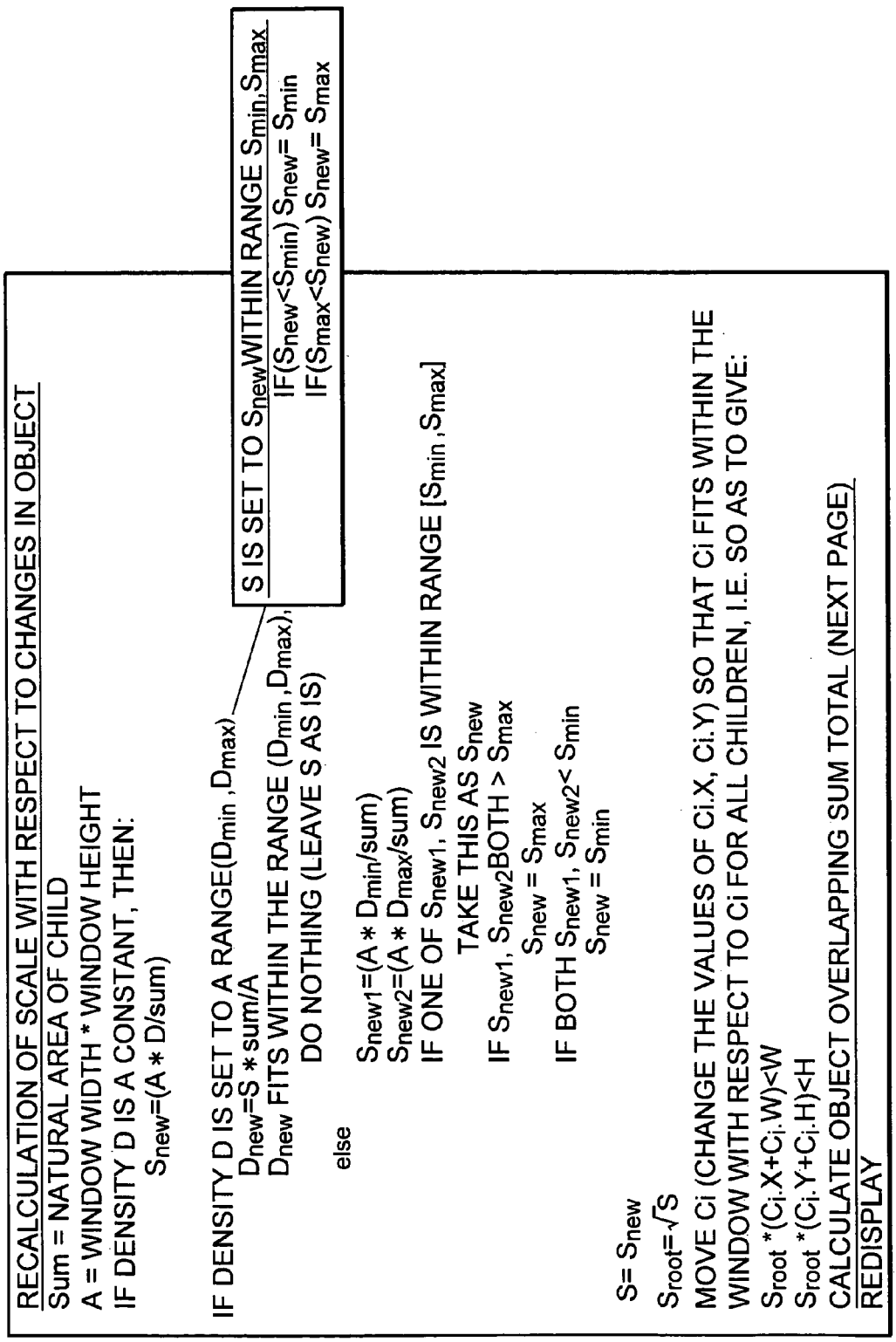

FIG. 11

RECALCULATION OF SCALE WITH RESPECT TO CHANGES IN OBJECT
Sum = NATURAL AREA OF CHILD
A = WINDOW WIDTH * WINDOW HEIGHT
IF DENSITY D IS A CONSTANT, THEN:
   $S_{new}=(A * D/sum)$ IF DENSITY D IS SET TO A RANGE($D_{min}$, $D_{max}$)
   $D_{new}=S * sum/A$
   $D_{new}$ FITS WITHIN THE RANGE ($D_{min}$, $D_{max}$),
      DO NOTHING (LEAVE S AS IS)
   else
      $S_{new1}=(A * D_{min}/sum)$
      $S_{new2}=(A * D_{max}/sum)$
   IF ONE OF $S_{new1}$, $S_{new2}$ IS WITHIN RANGE [$S_{min}$, $S_{max}$]
      TAKE THIS AS $S_{new}$
   IF $S_{new1}$, $S_{new2}$ BOTH > $S_{max}$
      $S_{new} = S_{max}$
   IF BOTH $S_{new1}$, $S_{new2}$ < $S_{min}$
      $S_{new} = S_{min}$ S IS SET TO $S_{new}$ WITHIN RANGE $S_{min}$, $S_{max}$
   IF($S_{new}$<$S_{min}$) $S_{new}= S_{min}$
   IF($S_{max}$<$S_{new}$) $S_{new}= S_{max}$ $S= S_{new}$
$S_{root}=\sqrt{S}$
MOVE Ci (CHANGE THE VALUES OF Ci.X, Ci.Y) SO THAT Ci FITS WITHIN THE WINDOW WITH RESPECT TO Ci FOR ALL CHILDREN, I.E. SO AS TO GIVE:
$S_{root}$ *(Ci.X+Ci.W)<W
$S_{root}$ *(Ci.Y+Ci.H)<H
CALCULATE OBJECT OVERLAPPING SUM TOTAL (NEXT PAGE)
REDISPLAY

FIG. 12

OBJECT OVERLAPPING SUM TOTAL CALCULATION

REPEAT THE FOLLOWING A SPECIFIED NUMBER OF TIMES, OR UNTIL
ALL POINTS OF INTERSECTION BETWEEN OBJECTS ARE RESOLVED.

WHEN MOTION VECTORS $C_i.dx$ $C_i.dy$ ARE RESET WITH RESPECT TO ALL
CHILD OBJECTS $C_i$

AND WITH RESPECT TO TWO GROUPS $C_i$, $C_j$ FOR ALL CHILD OBJECTS,
WHEN BOTH PARTIES INTERSECT:
  $dx = C_i.xc - C_j.xc$   ($C.xc$ IS THE X-COORDINATE OF THE CENTER COORDINATE OF C)
  $dy = C_i.yc - C_j.yc$   ($C.yc$ IS THE Y-COORDINATE OF THE CENTER COORDINATE OF C)
  $dist = \sqrt{(dx*dx + dy*dy)}$ (DISTANCE)
  $C_i.dx = C_i.dx + dx/dist$
  $C_i.dy = C_i.dy + dy/dist$
  $C_j.dx = C_j.dx - dx/dist$
  $C_j.dy = C_j.dy - dy/dist$
  (WHEN $dist = 0$, $dx$, $dy$ ARE SET TO SMALL RANDOM NUMBERS)
FOR ALL CHILD OBJECTS $C_i$,
THE POSITION OF $C_i$ IS MOVED BASED ON $C_i.dx$, $C_i.dy$.
  $C_i.x = C_i.x + C_i.dx$
  $C_i.y = C_i.y + C_i.dy$
  $C_i$ IS ADJUSTED SO AS NOT TO PROTRUDE FROM THE PARENT WINDOW REGION

INFORMATION DISPLAYING METHOD, INFORMATION DISPLAYING DEVICE, AND COMPUTER PROGRAM

CROSS REFERENCES TO RELATED APPLICATIONS

The present application claims priority from Japanese Application No. 2003-165877 filed Jun. 11, 2003, the disclosure of which is hereby incorporated by reference herein.

BACKGROUND OF THE INVENTION

The present invention relates to an information displaying method, information displaying device, and computer program for displaying processing results of a computer on a screen. In particular, the present invention relates to an information displaying method, information displaying device, and computer program for displaying information on a GUI (Graphical User Interface) screen providing a graphics-based operating environment.

More specifically, the present invention relates to an information displaying method, information displaying device, and computer program for displaying objects, such as documents and photographs managed in a hierarchical manner using directories and folders, on a GUI screen in a manner which is easy to see. In particular, the present invention relates to an information displaying method, information displaying device, and computer program for dynamically displaying objects on a GUI screen in a manner that is easy to see in response to changes in the number of icons within a window or frame and changes in the window size or frame size, and the display density of display objects within a display region such as for the number of display objects on a desktop screen or within a window or frame.

With the recent dramatic advances in the field of Information Technology (IT), various kinds of computer systems have been developed and manufactured and have become widespread in universities and institutions, in business offices, and within typical households. In addition to document files in text format, various resource objects such as audio and images are put into digital form and then put into prescribed formats so as to be handled by a computer in a standardized manner.

Further, the majority of recent computer systems also come equipped with bitmap display functions (functions where a display is depicted in pixel units) as a result of improvements in processor computing power and enhancement of video subsystems. Moreover, operating systems (OS) supporting bitmap display formats are replacing character-based DOS screens, i.e., CUIs (Character User Interfaces), with incorporation of a GUI (Graphical User Interface) to provide graphics-based operating systems being a well-known common use at the present time.

For example, Macintosh® from Apple Computer, Inc. and Windows® from Microsoft Corporation are well-known GUI-based environments. GUI environments are also being introduced to environments that were not originally designed based on GUIs, such as with the X-window system of the Linux OS.

A desktop and countless icons simulating a computer system are prepared on a display screen under a GUI environment. Here, "desktop" refers to a screen where a user carries out operations, and is a background where display objects such as icons and windows are set up. Further, "icon" refers to a small picture displaying a resource object that can be used on the computer system that may be displayed on the desktop or on a window within the desktop. An "icon" is a symbol embodying a resource object, such as an application, disk drive, folder (directory), or file on a desktop.

A "window" is a frame defining an operating region displayed on the desktop for displaying objects. A "window" is an industry standard, and is taken to have the basic configuration elements of a window title bar and a window border. A "title bar" is a bar for displaying the title of the window and identifies information currently displayed in the window using the title, i.e., resource object entities.

All resource objects handled by a computer system can be expressed as icons on a desktop screen provided by a GUI. Further, the processing of each resource object can be implemented with intuitive operations such as clicking, dragging, and dropping using a mouse.

Moreover, hierarchical methods for managing computer files have also been introduced. Namely, pluralities of files are grouped together in a directory (or folder), and collections of objects comprised of files or directories of the same hierarchy can then be collected together in a higher-order directory. A plurality of windows corresponding to directories are defined on the desktop screen, with icons corresponding to lower order files and directories belonging to a directory being stored within each window.

For example, icons representing files that can be processed, folders and applications can be displayed on the desktop screens provided by OS's, such as Macintosh® from Apple Computer, Inc. or Windows® from Microsoft Corporation, or in an "explorer" window opened in the desktop screen.

Defining a plurality of windows on a screen and arranging icons and thumbnail images corresponding to objects within each window is typical as a method for managing objects such as documents and photographs on a GUI screen. For example, an icon for an object may be added within a certain window, deleted from a window, or moved between windows.

A user can then intuitively understand a situation with regards to managing objects by looking at icons displayed within a window. However, when the number of icons within a window becomes large, it is no longer possible to fit all of the icons within a single window. In this case, a scroll bar is introduced, so as to make the window size larger in a virtual manner to give the appearance that all of the icons fit into the window. However, only a partial region that can be designated using the scroll bar can be confirmed on the screen, with icons outside of this region not being visible. This makes it difficult to discern which files belong to which window. In other words, browsability is impaired.

Further, browsability is also impaired in a similar manner when the number of icons is not changed but the window size is reduced.

Moreover, as when a large number of icons are present within a window, when a large number of windows are open on the desktop screen, the windows may overlap with each other and the screen may similarly become difficult for the user to see.

Even in a situation where all of the objects can be displayed on the desktop or within a window so that browsability can be confirmed, when a background area, i.e., an area where objects are not yet arranged, becomes small, it becomes difficult to see the objects. This area where objects are not yet arranged is a region corresponding to an operating region where new objects can be arranged, with a reduction of this area placing psychological pressure on the user.

For example, an operating method referred to as a "Zooming UI" is possible, in which a user can freely control magnification of specific display targets so that, when a large number of icons are arranged in a large plane, the icons may be compressed so that all of the icons may be seen, while on the contrary, icons may be enlarged when it is desired to see specific icons in more detail. See, for example, K. Perlin et al., "Pad: An Alternative Approach to the Computer Interface" (SIGGRAPH '93, pp. 57-64 (1993)) and B. B. Bedreson et al., "Pad++: A Zooming Graphical Interface for Exploring Alternate Interface Physics" (In Proceedings of the 7$^{th}$ Annual ACM Symposium on User Interface Software and Technology).

However, it is extremely difficult to always fit a hierarchical display composed of a plurality of windows in a screen size even when a zooming UI is utilized. Namely, when the display is enlarged only in the vicinity of a specific window, surrounding windows can no longer be displayed on the screen, and browsability is impaired.

Software referred to as "AutoSmall" for automatically switching over to displaying smaller icons when the number of desktop icons increases also exists (for example, refer to http://www.forest.impress.co.jp/article/2002/06/06/okiniiri.ht ml). However, in this case, when the number of icons exceeds a certain fixed value, the icons become small in a rapid and discontinuous manner. It is therefore possible that this will cause the user to feel discomfort and alarm as the user continues to look at the screen. It is therefore preferable to be able to sequentially control whether the background is secure for an operating region such as a desktop in a stage where icons are added sequentially to take into consideration the point of view of visual effects. The present inventors consider the viewpoint of visual effects to be an extremely important element in a GUI environment.

SUMMARY OF THE INVENTION

In view of the above-described points, the present invention provides a superior information displaying method, information displaying device, and computer program capable of displaying information on a GUI (Graphical User Interface) screen for providing a graphics-based operating environment in an appropriate manner.

The present invention further provides a superior information displaying method, information displaying device, and computer program capable of displaying objects such as documents and photographs managed in a hierarchical manner using directories and folders on a GUI screen in a manner that is easy to see.

The present invention still further provides a superior information displaying method, information displaying device, and computer program capable of displaying objects on a GUI screen in a manner which is easy to see according to the number of icons within a window, changes in window size, and the number of objects displayed on the desktop screen.

In order to take the aforementioned problems of the prior art technique into consideration, the present invention provides a method for displaying objects in an information space on a screen, the screen having a total area, the method including arranging an operating window on the screen, the operating window containing an initial number of display objects; accepting user operations at the screen; processing at least one of the operating window and the display objects within the operating window according to the user operations, the processing of the operating window resulting in the operating window having an area occupying a percentage of the total area of the screen, and the processing of the display objects resulting in the display objects having a total area occupying a percentage of the area of the operating window; and controlling the display of the operating window and the display objects on the screen, the display of the operating window being based on the percentage of the total area of the screen occupied by the operating window and the display of the display objects being based on the percentage of the area of the operating window occupied by the display objects.

Further, in a second aspect of the present invention, there is provided another method for displaying objects in an information space on a screen, the screen having a total area. The method includes arranging an initial number of operating windows on the screen, each operating window having a size and containing an initial number of display objects, each display object having a size; accepting user operations at the screen; processing at least one of the operating windows and the display objects within the operating windows according to the user operations, the processing of the operating windows resulting in the display of more or less operating windows on the screen than the initial number of operating windows, and the processing of the display objects resulting in the display of more or less display objects in at least one of the operating windows than the initial number of display objects; and controlling the display of the operating windows and the display objects on the screen, the display of the operating windows including recalculating the sizes of the operating windows on the screen when the processing of the operating windows results in the addition of at least one operating window to the screen or the deletion of at least one operating window from the screen, and the display of the display objects including recalculating the sizes of the display objects in at least one of the operating windows when the processing of the display objects results in the addition of display objects to the at least one operating window or the deletion of display objects from the at least one operating window.

The "operating window" referred to here may include operating regions on a desktop screen referred to as "windows" or "frames", and "applet displays", etc.

Further, "display object" is taken to include icons symbolizing files such as computer programs and computer data and icons symbolizing directories comprised of file sets.

Moreover, a hierarchical directory structure may be adopted where a directory is correlated with lower order files and directories, with operating windows being defined on the screen for every directory. Namely, the screen display is such that the total area of the desktop screen is allotted to a root directory, and display objects of lower order files and directories are contained within an operating window of the closest upper order directory.

The step of processing the operating window may include at least one of adding an operating window to the screen, deleting an operating window from the screen, and changing a size of the operating window.

The display control step may include recalculating the total area of the operating windows in response to an increase or a reduction in the number of operating windows on the screen, and adjusting a size of each operating window so that the percentage of the total area of the screen occupied by the operating windows is a fixed value or less.

For example, when a new operating window is added to the display screen or the size of an operating window is enlarged, the display control unit reduces the size of the operating window or adjusts the scale with respect to the initial size so that the percentage of the total area of the screen occupied by the operating windows is a fixed value or less.

The step of processing the display objects may include at least one of adding display objects to an operating window, deleting display objects from an operating window, and moving display objects between operating windows.

The display control step may include recalculating the total area of the display objects within the operating window in response to an increase or a decrease in the number of display objects contained within the operating window, and adjusting a size of each display object within the operating window so that the percentage of the area of the operating window occupied by the display objects is a fixed value or less.

For example, in a case where a new display object is added to the operating window and the percentage of the area of the operating window occupied by the display objects exceeds the fixed value, the size of each display object in the operating window is reduced or the scale with respect to the initial size of each display object is adjusted so that the percentage of the area of the operating window occupied by the display objects is a predetermined value or less.

Namely, according to the present invention, the overall area ratio of the operating window and the display objects is recalculated every time there is a change (addition, deletion, movement) in the display objects, such as icons, etc., in the operating windows, such as the desktop or window frames.

As a result, browsability of the display objects on the computer screen is ensured. Further, margin regions where there are always no objects displayed can be ensured at operating regions such as the desktop or window frame so as to alleviate the psychological operation load felt by the user when adding display objects, etc.

Further, according to the present invention, it is possible for all information to be displayed on a computer screen in a manner which is easy to understand in hierarchical windows adopting a directory structure.

It is therefore possible to ensure browsability when a sufficient margin remains on the screen or operating window, i.e., when the percentage of the area occupied is sufficiently low. It is therefore also possible to not carry out an operation of enlarging the display size of windows even when the number of icons is small. In this case, the percentage of the area occupied is adjusted in the display control step so that the scale of an operating window or display object does not exceed a range of one.

Further, the step of processing the operating window or processing the display objects may include changing the size of a specific operating window or display object according to a change in importance of the operating window or display object, a user operation, or another event.

In this case, the display control step may include recalculating the total area of the operating windows on the screen according to the change in size of one or more operating windows on the screen, and adjusting the size of other operating windows with respect to the initial size of each operating window so that the percentage of the total area of the screen occupied by the operating windows is a fixed value or less.

Further, the display control step may include recalculating the total area of the display objects within the operating window according to the change in size of one or more display objects contained within the operating window, and adjusting the size of each display object in the operating window with respect to the initial size of each display object so that the percentage of the area of the operating window occupied by the display objects is a fixed value or less.

Further, in order to achieve a period where browsability of objects and ease of viewing of the screen is ensured without unnecessary processing being carried out, the display control step may further include setting at least one of an upper limit value and a lower limit value for the percentage of the area of the operating window occupied by the display objects.

Alternatively, the display control step may further include a step of setting at least one of an upper limit value and a lower limit value for a size of each display object.

Moreover, the display control step may include causing a repulsion force to act between operating windows so that, when a new operating window is added to the screen, the operating windows move to respective display positions in which each operating window does not overlap with another operating window.

Similarly, the display control step may further include causing a repulsion force to act between display objects so that, when a new display object is added to an operating window, the display objects move to respective display positions in which each display object does not overlap with another display object.

Further, in a third aspect of the present invention, there is provided a recording medium recorded with a computer program for executing a process for displaying objects in an information space on a screen, the screen having a total area. The process includes arranging an operating window on the screen, the operating window containing an initial number of display objects; accepting user operations at the screen; processing at least one of the operating window and the display objects within the operating window according to the user operations, the processing of the operating window resulting in the operating window having an area occupying a percentage of the total area of the screen, and the processing of the display objects resulting in the display objects having a total area occupying a percentage of the area of the operating window; and controlling the display of the operating window and the display objects on the screen, the display of the operating window being based on the percentage of the total area of the screen occupied by the operating window and the display of the display objects being based on the percentage of the area of the operating window occupied by the display objects.

In a fourth aspect of the present invention, a recording medium is recorded with a computer program for executing a process for displaying objects in an information space on a screen, the screen having a total area. The process includes arranging an initial number of operating windows on the screen, each operating window having a size and containing an initial number of display objects, each display object having a size; accepting user operations at the screen; processing at least one of the operating windows and the display objects within the operating windows according to the user operations, the processing of the operating windows resulting in the display of more or less operating windows on the screen than the initial number of operating windows, and the processing of the display objects resulting in the display of more or less display objects in at least one of the operating windows than the initial number of display objects; and controlling the display of the operating windows and the display objects on the screen, the display of the operating windows including recalculating the sizes of the operating windows on the screen when the processing of the operating windows results in the addition of at least one operating window to the screen or the deletion of at least one operating window from the screen, and the display of the display objects including recalculating the sizes of the display objects in at least one of the operating windows when the processing of the display objects results in the addition of display objects to the at least one operating window or the deletion of display objects from the at least one operating window.

The computer program of each of the third and fourth aspects of the present invention is defined as a computer program described in a computer-readable format capable of implementing the prescribed processes on a computer system. In other words, by installing the computer program of each of the third and fourth aspects of the present invention on a computer system, cooperative action is exhibited by the computer system so that operating results that are the same as those for the information displaying method of each of the first and second aspects of the present invention can be obtained.

Further objects, features and advantages of the present invention will become clear from the following detailed description based on embodiments of the present invention and the appended drawings.

As described in detail above, according to the present invention, it is possible to provide a superior information displaying method, information displaying device, and computer program capable of displaying objects such as documents and photographs managed in a hierarchical manner using directories and folders on a GUI screen in a manner that is easy to see.

Further, according to the present invention, it is possible to provide a superior information displaying method, information displaying device, and computer program capable of displaying objects on a GUI screen in a manner which is easy to see according to the number of icons within a window, changes in the window size, and the number of objects displayed on the desktop screen.

According to the present invention, it is possible for all information to be displayed on a computer screen in a manner which is easy to understand in a hierarchical window display.

Further, in the present invention, the overall area ratio of the operating region and the display objects is recalculated every time there is a change (addition, deletion, movement) in the display objects, such as icons, etc., in the operating regions, such as the desktop or window frames, etc. As a result, browsability of the display objects on the computer screen is ensured. Further, margin regions where there are always no objects displayed can be ensured at operating regions such as the desktop or window frame so as to alleviate the psychological operation load that the user feels when adding display objects.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3 is a view illustrating an operating example for a display object within a conventional window.

FIG. 4 is a view showing a situation where a margin region is ensured within a window in a case of adding icons to a window.

FIG. 5 is a view showing a situation for carrying out an operation for ensuring a fixed margin region for a movement source window from which an icon is moved and a movement destination window to which the icon is moved, respectively.

FIG. 11 shows a pseudo program code showing a procedure for re-calculating a scale with respect to changes in displayed objects due to the addition of icons to or the deletion of icons from the window.

FIG. 12 shows a pseudo program code showing a procedure for alleviating overlapping of displayed objects within a window.

DETAILED DESCRIPTION

In the following, a detailed description of the present invention is given with reference to the attached drawings.

Figure 1:
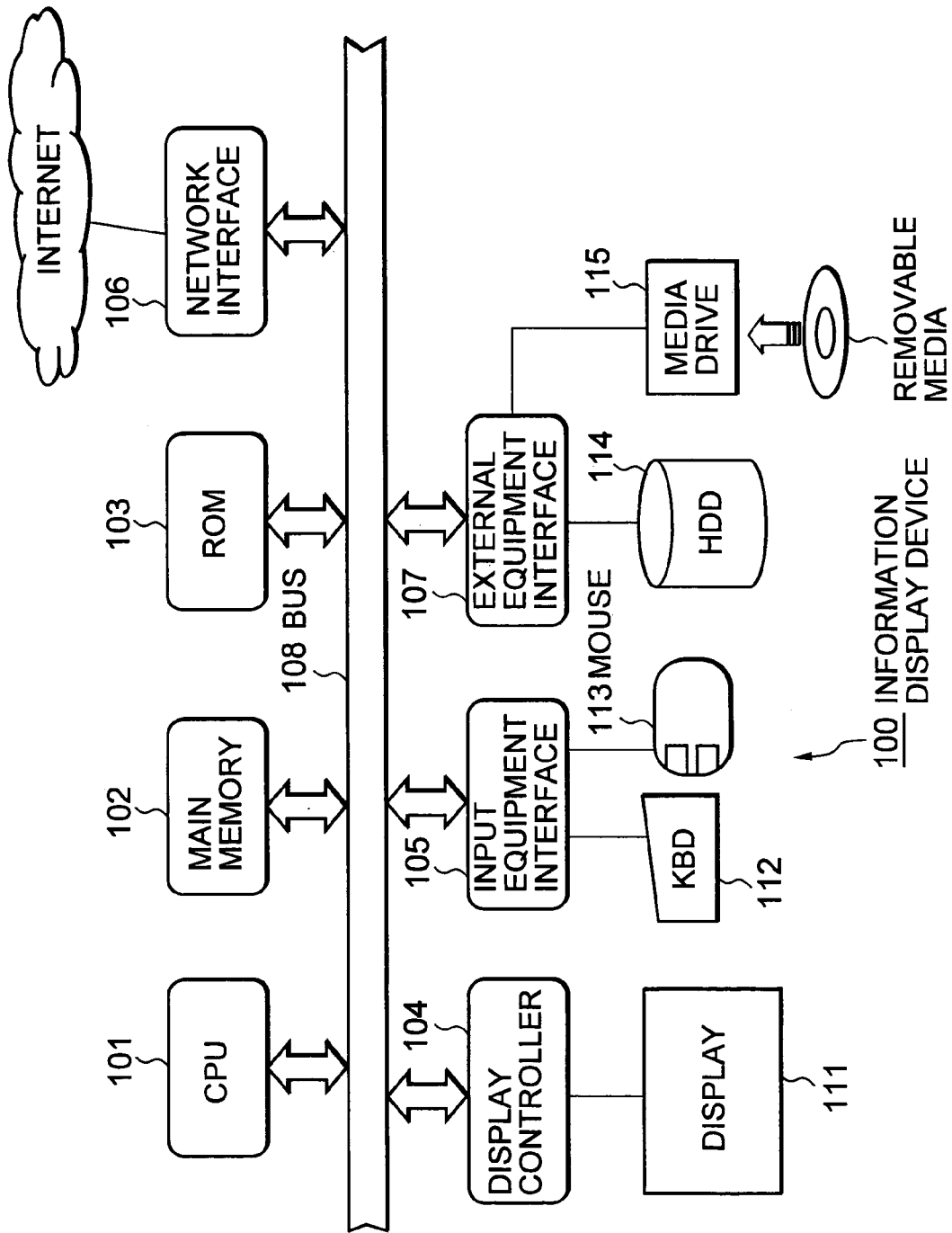
FIG. 1 is a view schematically showing a hardware configuration for an information displaying device 100 of an embodiment of the present invention.

By displaying all objects such as documents and photographs, etc. managed hierarchically using directories and folders, etc. on a GUI (Graphical User Interface) screen for providing a graphics-based operating environment in a manner which is easy to see, it is anticipated that the information displaying device of the present invention will be still more effective. A hardware configuration for an information displaying device 100 of a first embodiment of the present invention is schematically shown in FIG. 1.

A CPU (Central Processing Unit) 101 constituting a main controller executes a variety of applications under the control of the operating system (OS). The operating system is equipped with sub-systems including a memory manager for managing a system memory space, a file manager for managing a file space, a resource manager for carrying out system resource management, a window manager for managing window operations in the GUI environment, and so on.

Figure 2:
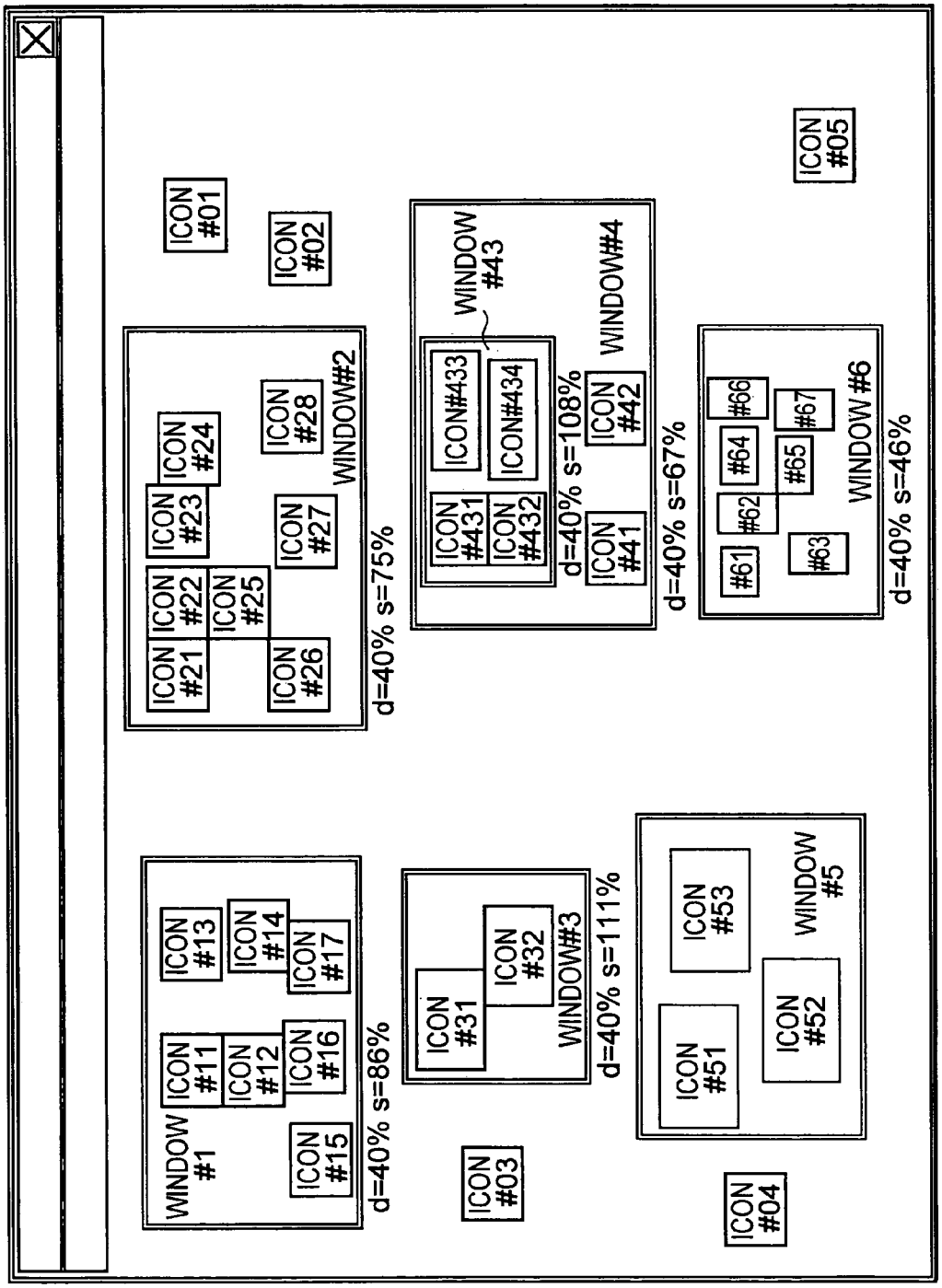
FIG. 2 is a view showing an example configuration for a desktop screen of the information displaying device 100 of FIG. 1.

As shown in FIG. 2, the CPU 101 is mutually connected to other types of equipment (described later) by a bus 108.

Main memory 102 is a storage device used for loading program code to be executed by the CPU 101 and for temporarily storing work data during execution of the programs and may be configured from semiconductor memory such as, for example, a DRAM (Dynamic RAM). For example, the operating system and applications may be loaded in the main memory 102 as executed programs.

A ROM (Read Only Memory) 103 is a semiconductor memory for permanently storing data and is written with POST (Power On Self Test) code, hardware input/output program code (BIOS: Basic Input/Output System), etc.

A display controller 104 is a dedicated controller for actual processing of drawing commands issued by the CPU 101. Drawing data processed by the display controller 104 is output as images on a display 111 after being written temporarily to, for example, a frame buffer (not shown). The display screen of the display 111 typically has a role of providing feedback to enable a user to visualize input content and processing results, as well as errors and other system messages. The display controller 104 and the display 111 of this embodiment are capable of bitmap displaying and a GUI operating screen can be presented on the display screen.

An input equipment interface 105 is a device for connecting user input equipment, such as a keyboard 112 or a mouse 113, etc., to the information displaying device 100. The keyboard 112 and the mouse 113 have a role of taking user input such as data and commands into the system. In this embodiment, the mouse 113 is used in order to carry out window and icon operations (opening and closing of windows on the desktop screen, addition of icons to and deletion of icons from a window, and moving of icons between windows) on the desktop screen.

A network interface 106 is capable of connecting the information displaying device 100 to a local network such as a LAN (Local Area Network) or to a wide-area network such as the Internet in accordance with a prescribed communication protocol such as an Ethernet (registered trademark).

A plurality of terminals (not shown) are connected to the network in a transparent state so as to construct a distributed computing environment over a network. It is possible to carry out distribution services over the network, such as for software programs and data content. It is then possible, for example, to download programs such as operating systems, applications, modules constituting a program, or the like via a network.

An external equipment interface 107 is a device for connecting external devices such as a hard disk drive (HDD) 114 and a media drive 115 to the information displaying device 100.

The HDD 114 is an (well-known) external storage device mounted with a fixed magnetic disk as a storage medium and is superior to other external storage devices with respect to storage capacity and data transfer speed. Putting software programs onto the HDD 114 in an executable state is referred to as "installing" the program onto the system. For example, an operating system and application programs executed by the CPU 101 and device drivers for operating each item of peripheral equipment are installed in the HDD 114.

The media drive 115 is a device for mounting removable media, such as CDs (Compact Discs), MOs (Magneto-Optical discs), and DVDs (Digital Versatile Discs), and for accessing the data recording surfaces of these media. The removable media is mainly used for the purpose of backing up software programs and data files, etc. as computer-readable data and for moving the data between systems (including selling, circulating and distributing). For example, operating systems and application programs, programs such as device drivers and program modules can be circulated and distributed physically between a plurality of items of equipment by utilizing this removable media.

An example of the information displaying device 100 as shown in FIG. 1 would be an IBM USA personal computer "PC/AT (Personal Computer/Advanced Technology)—compatible computer, or one of its successors. Naturally, it is also possible for computers configured from other architectures to be applied as the information displaying device 100 of this embodiment.

With the information displaying device 100 of this embodiment, file spaces are managed by hierarchical directory structures, with directories being made to correlate to files and lower order directories. Icons symbolizing files such as computer programs and computer data and icons symbolizing directories comprised of file sets are presented on the desktop screen.

Further, an operating window is defined for every directory on the desktop screen. Namely, the whole of the desktop screen is allotted to a root directory, and displayed objects of lower order files and directories are displayed on the screen so as to be contained within an operating window frame of the closest upper order directory. User operations with respect to the displayed objects, such as windows and icons are, for example, carried out via a mouse.

The information displaying device 100 of this embodiment of the invention displays all information on a computer screen in a manner which is easy to understand using hierarchical window displaying. For example, objects are displayed on the computer screen in a manner that is easy to see according to the number of icons within a window, changes in window size, and the number of objects displayed on the desktop screen. The method shown in the following is adopted to this end.

(1) The screen is assumed to have a hierarchical structure for windows. Namely, the entire screen is taken as a root window, with child windows being arranged on the root window. Further, each of the child windows has therein lower order windows. The size of the windows can be changed by the user using a mouse.

(2) The respective windows have their own independent scales. It is not necessary for the user to explicitly specify the scales of all of the windows.

(3) The scales are decided in such a manner that a ratio of the area of the information (icons and lower order windows) displayed within a window and the area of the whole window becomes fixed.

An example configuration for a desktop screen of the information displaying device 100 of this embodiment is shown in FIG. 2. In the desktop screen of this embodiment, the whole of the desktop screen is allotted to a root directory, and displayed objects of lower order files and directories are contained within an operating window frame of a closest upper order directory.

The windows in this embodiment can be displayed in a hierarchical manner. In the example shown in FIG. 2, six windows #1 to #6 and five icons #01 to #05 are displayed on the desktop screen. Icons #11 to #17 are contained in window #1, icons #21 to #28 are contained in window #2, icons #31 and #32 are contained in window #3, icons #41 and #42 and a window #43 are contained in window #4, icons #51 to #53 are contained in window #5, and icons #61 to #67 are contained in window #6.

Each window on the desktop screen possesses an independent scale. However, rather than the user explicitly specifying scales for all of the windows, the window sizes are dynamically decided in such a manner that a percentage of total area occupied by the windows on the desktop does not exceed a fixed value.

For example, when a new window is added to the desktop screen or the size of a certain window is enlarged as a result of a user operation, or when icons are added to or deleted from a window, the total area of the windows on the desktop screen and the total area of the icons within the windows are recalculated. When the percentage area occupied by the windows on the desktop screen exceeds a fixed value or the percentage area occupied by the icons within the windows exceeds a fixed value, the scale of each window and the scale of the icons displayed within each window is decided in such a manner that this fixed value is no longer exceeded.

In the example shown in FIG. 2, an icon display scale s of 86% is decided for window #1, an icon display scale s of 75% is decided for window #2, an icon display scale s of 111% is decided for window #3, an icon display scale s of 67% is decided for window #4, an icon display scale s of 141% is decided for window #5, and an icon display scale s of 46% is decided for window #6 based on calculation results for the percentage of area occupied.

By ensuring that the percentage area occupied on the desktop screen by the total area of the windows does not exceed the fixed value, in hierarchical window displaying, it is possible to ensure browsability of the icon display, and all information can be displayed on the computer screen in a manner that is easy to understand.

It is therefore possible to ensure browsability when a sufficient margin remains on the desktop screen, i.e., when the percentage of the area occupied by the windows is sufficiently low. It is therefore also possible to not carry out an operation of enlarging the display size of windows even when the number of windows open is small. In this case, the occupancy percentage may only be adjusted within a range where the scale of the windows does not exceed one.

It is also possible to change the size of a specific operating window according to a change in a weighting possessed by the window, a user operation, or another event. In this case, the total area of a window may be recalculated according to a change in the size of any particular window on the desktop screen, and the size or scale of other windows present on the desktop screen may be adjusted in such a manner that the occupancy percentage with respect to the area of the desktop screen becomes a fixed value or less than the fixed value.

Further, it is possible to set a margin of a certain extent in the occupancy percentage in such a manner that it is possible to guarantee easy browsability without having to carry out unnecessary processing. Namely, an upper limit value and a lower limit value may be set for the occupancy percentage of the total area of the windows on the desktop screen and it is also possible to provide fixed control to perform recalculating and resetting of the window sizes within this range.

Alternatively, it is possible to set an upper limit value and a lower limit value for scale so that each window has a size of one.

Further, it is also possible to cause a repulsion action to occur between windows so as to cause the respective display positions of the windows to move in order to ensure that each of the operating windows does not overlap when new windows are added to the desktop screen.

Menu items including "KeepAspect", "Relax", "Limit", "TopScale", "ScaleBub" and designating the occupancy percentage of displayed objects are prepared on a menu bar of the desktop screen of the present embodiment.

The menu item "KeepAspect" is for designating whether to keep an aspect ratio of the displayed object the same as the original image while performing recalculations and updating the object display when the occupancy percentage of a displayed object on the desktop screen of a window is increased.

The menu item "Relax" is for designating whether to carry out processing to cause repulsion between displayed objects so as to alleviate overlapping of the objects when the occupancy percentage of the displayed objects on the desktop screen or within a window is increased.

The menu item "Limit" is for designating whether to provide a limit for scale percentage ratios of windows on the desktop.

The menu item "TopScale" is a GUI component for designating whether to control the display size of displayed objects including windows, subwindows, frames, icons, thumbnails, and others, of lower hierarchical directories in the operation display region of the uppermost hierarchical layer based on methods of this embodiment. Specifically, in the example shown in FIG. 2, this is a menu item for designating whether to set a scale ratio to the desktop as a whole.

The menu item "ScaleBub" is for designating whether to show a displayed object at a reduced sized in a hierarchical window when moving a displayed object to a lower order window.

Designating occupancy percentage of displayed objects is a menu item for designating the occupancy percentage (i.e., density) or an upper limit value for displayed objects such as icons and windows on the desktop screen or within operating regions of the windows. In the example shown in FIG. 2, the occupancy percentage d is designated to be 40%.

Next, a description is given taking note of one window arranged on the desktop screen. Operations such as adding displayed objects such as icons, moving displayed objects between windows, and deleting displayed objects are possible according to, for example, user operations via a mouse within the windows, so that the number of displayed objects contained in a window can be increased or reduced.

An operating example for a displayed object within a conventional window is illustrated in FIG. 3. The scale of the icons (=100%) is fixed to remain as is regardless of the total number of icons and occupancy percentage within the windows. As a result, as shown in FIG. 3, as the number of icons increases, the occupancy percentage (density) of the total area of the icons within the window gradually increases so as to appear as 39%, 49%, and 98%. As a result, margins within the windows gradually disappear, the screen size becomes inadequate, and the icons become displayed in an overlapping manner. In other words, screen browsability is impaired.

On the other hand, an operating example for a displayed object within a window of the present invention is illustrated in FIG. 4. In this embodiment, the icon scale s is adjusted in such a manner that the information density d within the desktop screen and the operating region of the window, i.e., the occupancy percentage of the total area of the icons, becomes 40% (or the upper limit value does not exceed 40%).

Therefore, as shown in FIG. 4, even if one or more icons are added to a window, to ensure that the occupancy percentage d of the window does not exceed 40%, the scale s of the icons displayed is automatically adjusted to give the appearance of 100%, 90% and 63% so that an appropriate margin is always ensured within a window as a space where operations are possible. Further, this may take place without giving the user an unnatural impression because the scale of the icons changes gradually.

In this embodiment, the overall area ratio of the operating region and the displayed objects is recalculated every time there is a change (addition, deletion, movement) in the displayed objects, such as icons on operating regions such as the desktop or window frames.

As a result, the browsability of the displayed objects on the computer screen is ensured. Further, margin regions where there are always no objects displayed can be ensured in operating regions such as the desktop or window frame so as to alleviate the psychological operation load felt by the user in such a case of adding display objects.

The ensuring of a margin region within a window in the case of adding icons to the window is shown in the example in FIG. 4, but an operation for ensuring fixed margin regions at a movement source and movement destination window can also be carried out when moving icons between windows. Next, a description is given with reference to FIG. 5 to FIG. 7.

As shown in FIG. 5, a left-side window contains twelve icons and a right-side-window contains three icons. In a case where the occupancy percentage of the total area of icons in a window is set to 40%, the icon scale at the left-side window where the number of icons is large is small at 64%, whereas the scale for icons at the right-side window where there are a few icons is large at 130%.

Figure 6:
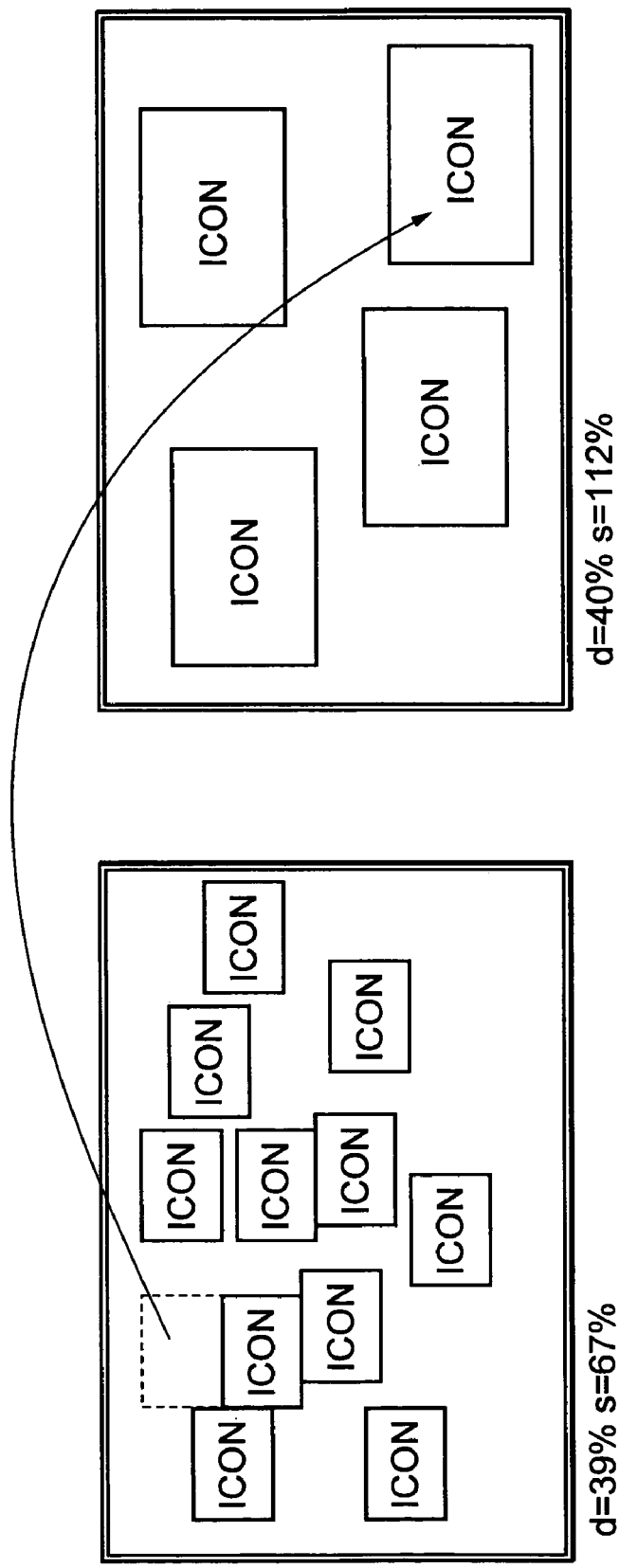
FIG. 6 is another view showing a situation for carrying out an operation for ensuring a fixed margin region for the movement source window and the movement destination window, respectively.

Here, assume that just one icon is moved from the left-side window to the right-side window. At this time, as shown in FIG. 6, the icon scale in the left-side window can be raised up to 67% because the information density, i.e., the number of icons, in the left-side window has been reduced. On the other hand, in the right-side window, the scale of the icons has to be reduced to 112% in order to maintain the occupancy percentage at 40% because the information density, i.e., the number of icons, has increased.

Figure 7:
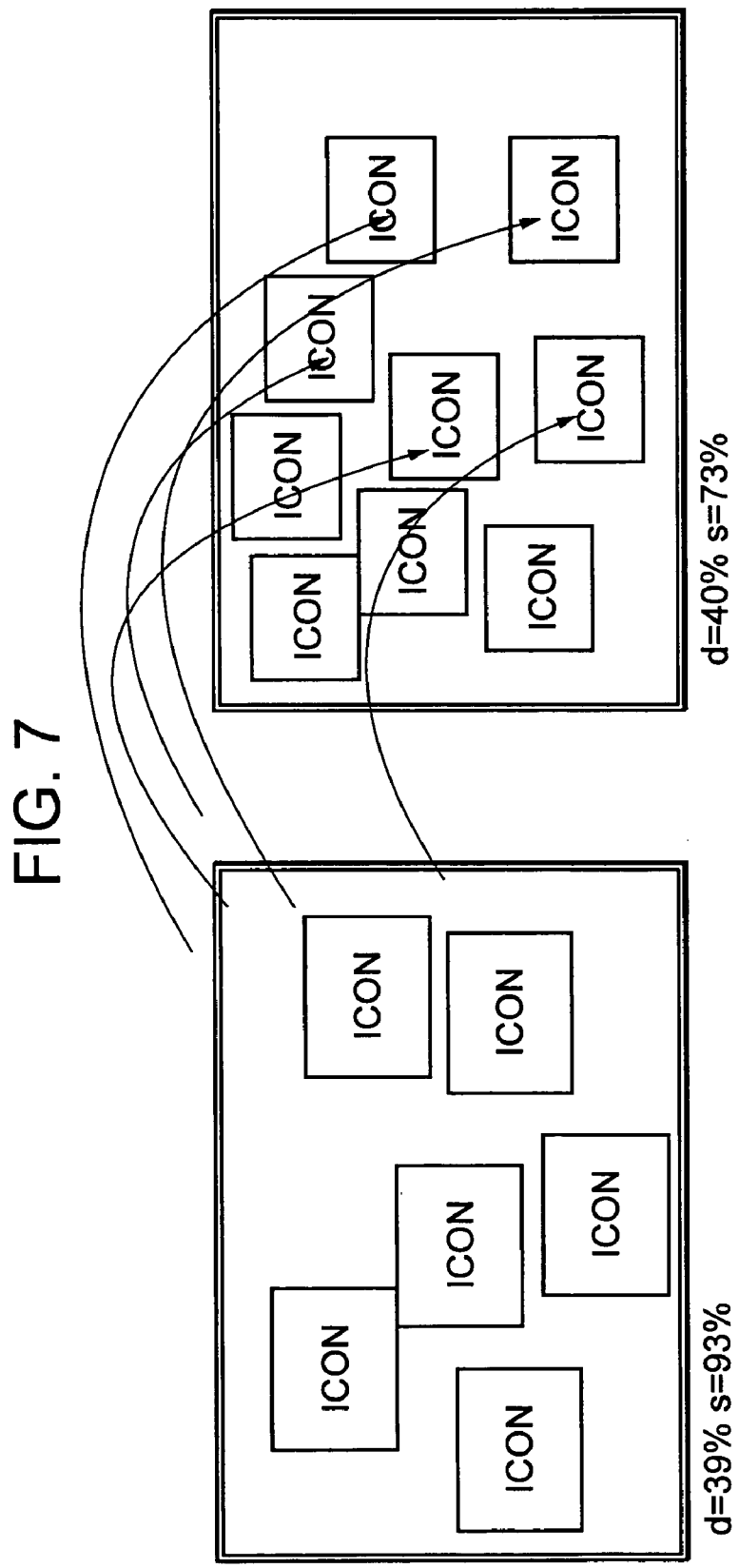
FIG. 7 is a further view showing a situation for carrying out an operation for ensuring a fixed margin region for the movement source window and the movement destination window, respectively.

Further, assume that five more icons are moved from the left-side window to the right-side window. At this time, as shown in FIG. 7, the icon scale in the left-side window can be raised up to 93% because the information density, i.e., the number of icons, in the left-side window has been substantially reduced. On the other hand, in the right-side window, the scale of the icons has to be reduced to 73% in order to maintain the occupancy percentage at 40% because the information density, i.e., the number of icons, has been substantially increased.

Figure 8:
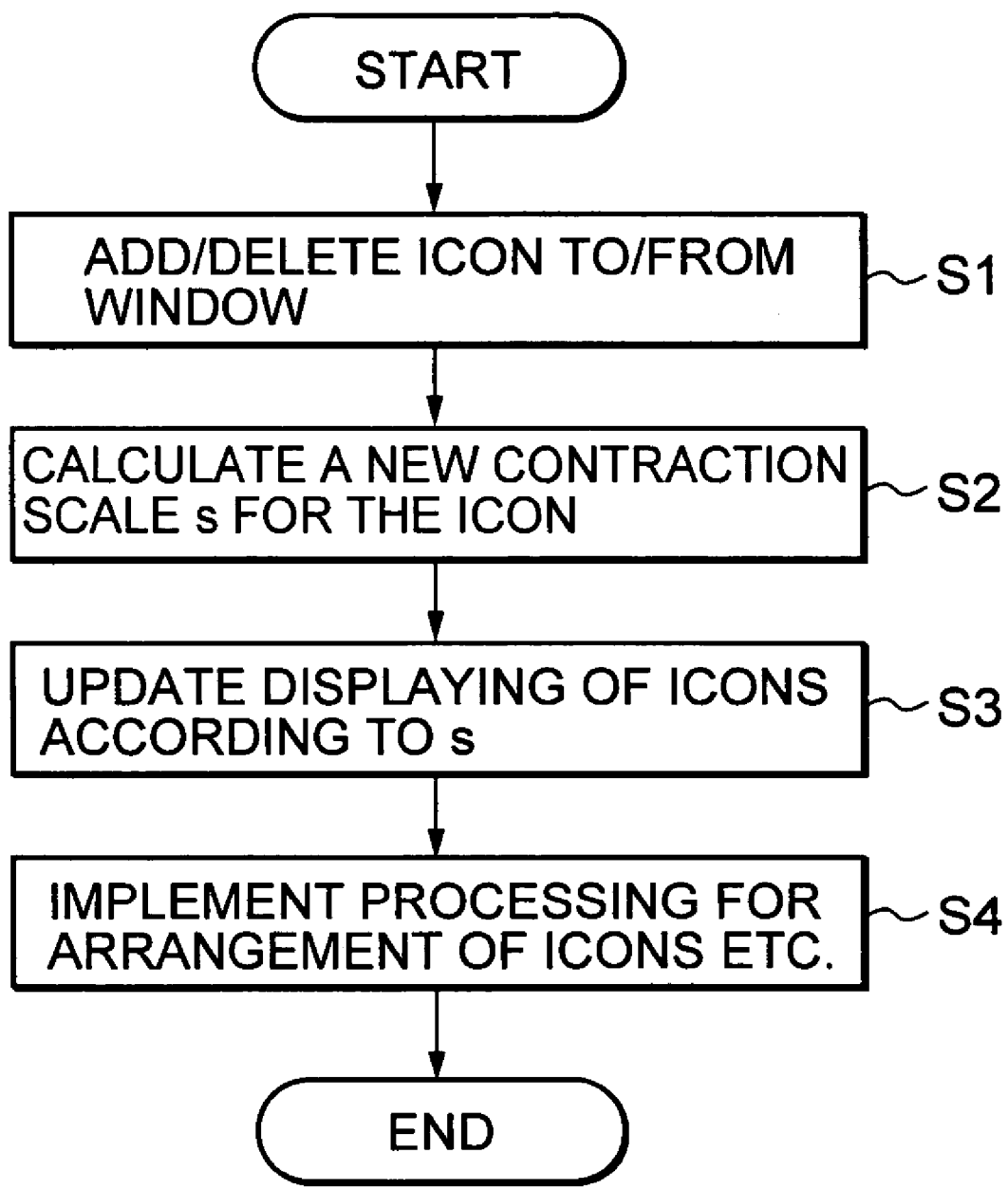
FIG. 8 is a flowchart showing a processing procedure for automatically adjusting the scale of icons when adding icons to or deleting icons from a window.

A processing procedure for automatically adjusting the scale of icons when adding icons to or deleting icons from a window is shown in FIG. 8 in the form of a flowchart.

The proportion of area taken up by information such as icons with respect to the entire area of the window is referred to as display density D. In this embodiment, the display density D is provided by the user, and the icon scale s is calculated backward in such a manner that the display density D becomes a fixed value or does not exceed the fixed value.

A natural area (i.e., the area when the scale is the default value (when setup is omitted)) for an i-th display object, such as an icon displayed in a window, is taken to be $M_i$. The default value may be set to one but it is also possible to have a configuration where this is changed to 0.9 or 1.1 according to the hierarchical layer containing the display object corresponding to the default value so that the user may be shown a hierarchical structure for the displayed objects in a more natural manner. The scale s utilized in displaying can be calculated from the following equation using the display density D. Here, A is an area of the window as a whole. The equal sign is for a case where the display density D is fixed, and the non-equal sign is for a case where the display density D does not exceed a fixed value.

$$s \cdot \sum_{i=1}^{n} M_i \geqq D \cdot A \qquad \text{Equation 1}$$

When an icon is added to or deleted from a window (step S1), a new scale is calculated according to the above equation (step S2).

Next, the scale of each icon within the window is changed according to the calculated scale S, and the window display is updated (step S3). Processing, such as the arrangement of the icons, is then carried out if deemed necessary (step S4).

Expressing this in an intuitive manner, automatic adjustment takes place in such a manner that the scale is large when only a few display objects are contained in a window, with the scale being decreased according to the situation as the number of displayed objects is increased. The calculation of the scale is executed every time a display object such as an icon is added to or deleted from a window, with the scale for all of the display objects within the window gradually being decreased as icons are added to the window.

It is also possible to carry out a process in the processing to arrange the icons in step S4 to ensure that displayed objects such as icons within the window do not overlap with each other. It is possible to apply processing that causes a repulsive force to act between icons so as to cause the display positions of the icons to move in such a manner as to prevent the icons from overlapping.

Figure 9:
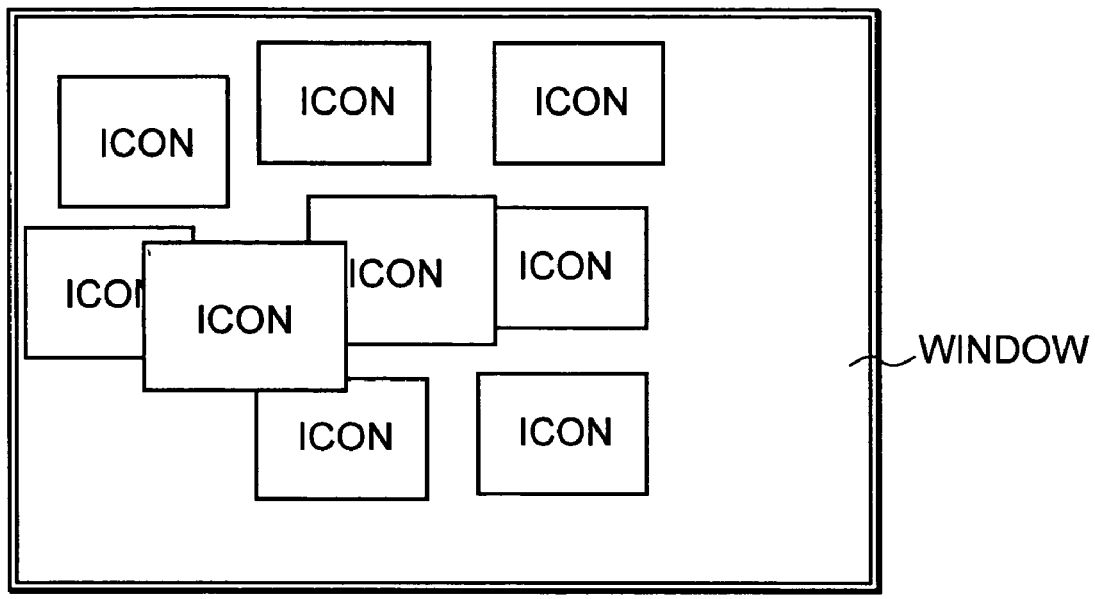
FIG. 9 is a view showing an example where a scale calculation and a layout calculation process for display objects are combined in order to prevent icons from overlapping with each other.
Figure 10:
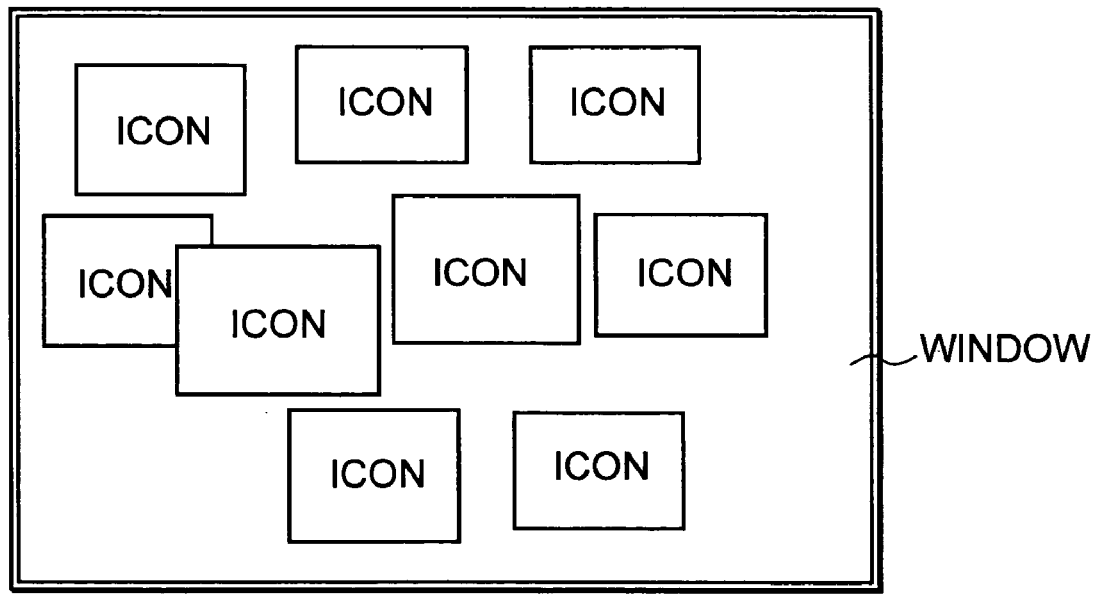
FIG. 10 is another view showing an example where a scale calculation and a layout calculation process for display objects are combined in order to prevent icons from overlapping with each other.

FIG. 9 and FIG. 10 show an example where scale calculation and layout calculation processing for displayed objects are combined in order to prevent icons from overlapping with each other.

Here, a repulsive force for resolving overlapping is defined for all combinations of two display objects. Repulsive forces for all combinations are then added together and the display objects are made to move along repulsive force vectors obtained as a result. The process is repeated until overlapping is alleviated for all of the display objects (or until a defined number of times of repeating is reached).

The situation directly after adding an icon to a window is shown in FIG. 9. As shown in FIG. 9, the new icon overlaps with other icons. The results of carrying out an adjustment of the display positions of the icons using repulsive force calculations are shown in FIG. 10, and the resolution of the overlapping of the icons shall now be understood in more detail.

A result of alleviating the overlapping is that the occupancy percentage of the total area of the icons within the window increases slightly.

With the conventional method of arranging icons shown in FIG. 3, the total area for the icons becomes larger than the area of the window. It is therefore not possible to guarantee that the overlapping of icons will be alleviated even if repulsion force calculations are carried out in a similar manner to that described above. However, with regard to this point, in this embodiment, the occupancy percentage of the total area of the icons in the window shown in FIG. 4 is kept to a fixed value or less. It is therefore possible for overlapping of the icons to be suitably alleviated by applying repulsion force calculations or by applying other icon arrangement algorithms.

A process for re-calculating the scale with respect to changes in the displayed objects, such as the addition of icons to and the deletion of icons from the window, is shown in the form of pseudo program code in FIG. 11. First, a value "sum" for the total natural (i.e., when the scale is a default value of, for example, 1) area of the displayed objects contained in the window is obtained. Window area A is then calculated.

Here, when the occupancy percentage of the displayed objects in the window, i.e., the display density D, is defined as a constant, a new scale $S_{new}$ relating to the displayed objects is given by the sum of the window area A and the display density D divided by the total area sum of the displayed objects. The new scale $S_{new}$ is then adjusted to fit between a lower limit value $S_{min}$ and an upper limit value $S_{max}$. Namely, when $S_{new}$ falls below the lower limit value $S_{min}$, $S_{new}$ is substituted with $S_{min}$. Further, when $S_{new}$ rises above the upper limit value $S_{max}$, $S_{new}$ is substituted with $S_{max}$. When an upper limit value and a lower limit value are not set for the scale, then calculations may be performed taking $S_{min}=0$ and $S_{max}=\infty$.

Further, in a case where the display density D of displayed objects in a window is defined as a lower limit value $D_{min}$ and an upper limit value $D_{max}$ which are allowable, first, a display density $D_{new}$ is calculated directly after a change in displayed objects within a window occurs, and a determination is made as to whether the display density $D_{new}$ falls between the lower limit value $D_{min}$ and the upper limit value $D_{max}$. If the result of this determination is affirmative, the scale of the display objects is not changed.

On the other hand, if the result of this determination is negative, the scales of the display objects are adjusted, and the display density D is made to fit between the lower limit value $D_{min}$ and the upper limit value $D_{max}$, i.e., a prescribed margin is ensured within the window. In this case, two new scales, a new scale $S_{new1}$ calculated using the lower limit value $D_{min}$ for the display density, and a new scale $S_{new2}$ calculated using the upper limit value $D_{max}$, are calculated. If either of $S_{new1}$ and $S_{new2}$ fall between the lower limit value $S_{min}$ and the upper limit value $S_{max}$, then this is substituted for the new scale $S_{new}$. In the case where both $S_{new1}$ and $S_{new2}$ exceed the maximum limit value $S_{max}$, the upper limit value $S_{max}$ is substituted for the new scale $S_{new}$. In the case where $S_{new1}$ and $S_{new2}$ both fall below the minimum limit value $S_{min}$, the lower limit value $S_{min}$ is substituted for the new scale $S_{new}$.

The scale handled up to this point is the area ratio, and this is converted to a square root in order to reduce a dimension ratio.

Next, the display positions of the displayed objects are moved for all of the displayed objects $C_i$ in the window, so that $C_i$ objects fit within the window frame.

Finally, calculations are executed to alleviate overlapping of displayed objects within the window.

A process for alleviating overlapping of displayed objects within a window is shown in the form of pseudo program code in FIG. 12. A repulsive force for resolving overlapping is defined for all combinations of two display objects. Repulsive forces for all combinations are then added together and the displayed objects are made to move along repulsive force vectors obtained as a result. The process is repeated until overlapping is alleviated for all of the displayed objects (or until a defined number of times of repeating is reached).

An example of a data structure used in order to carry out display processing for the windows and icons described above at a desktop screen is shown in FIG. 13.

As described above, the whole of a desktop screen is allotted to a root directory, and display objects of lower order files and directories are made to correlate with the closest upper order directory.

Figure 13:
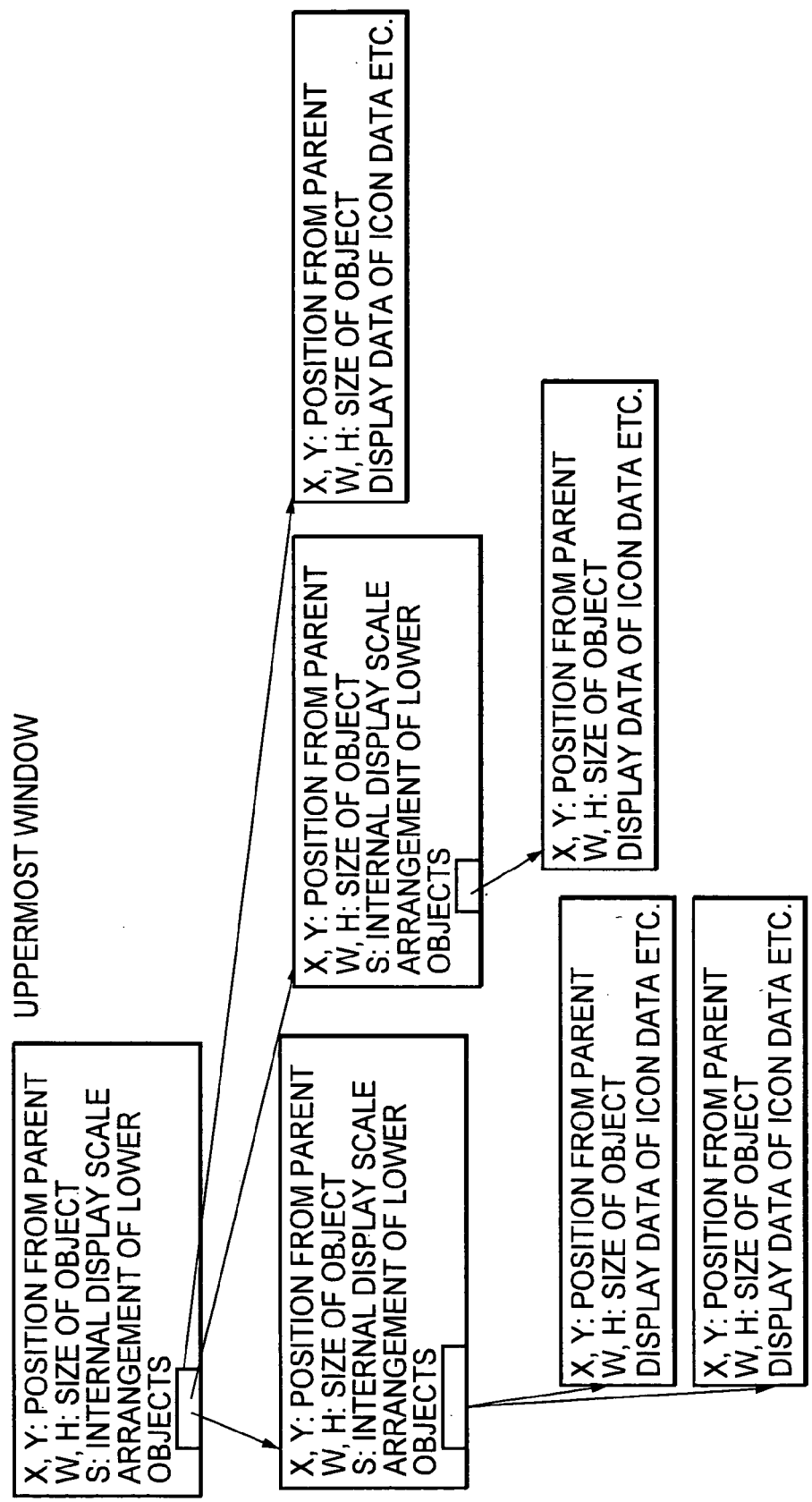
FIG. 13 is a view showing an example of a data structure used in order to carry out display processing for the windows and icons described above on a desktop screen.

As shown in FIG. 13, control programs are prepared for each display object such as windows and icons on a desktop screen.

A control block relating to a window maintains the relative position (X, Y) from a new window, the size of the window (W, H), the scales S applied to objects displayed within the window, and references to lower order windows and icons. References to lower order objects may be maintained in either a pointer format or an array format.

Further, a control block relating to an icon may maintain the relative position (X, Y) from a new window, the size (W, H) of the icon, and display data for the icon itself, such as bitmap data.

Supplement

In the above, a detailed description is given of the present invention while referring to a specific preferred embodiment. However, it is evident that various modifications and substitutions may be made to the preferred embodiment by one skilled in the art without deviating from the scope of the present invention.

The present invention displays display objects, such as windows, icons, and thumbnail images, on a GUI-based desktop-screen dynamically in a manner that is easy to see according to screen operations such as changing the size, or adding and deleting displayed objects. The present invention may be applied to various GUI environments such as Macintosh® from Apple Computer, Inc., Windows® from Microsoft Corporation, Unix®, and the X-windows operating systems.

Further, a description is given in this specification centered on a GUI structure mainly configured from windows and icons, but the essence of the present invention is by no means limited in this respect. The present invention may also be applied to various other items taken as display regions other than windows, such as, for example, frames, objects embedded with images, applet displays, or part or all of display objects that may be utilized as display regions capable of displaying still smaller display objects within. Further, the present invention may also be applied to various items other than icons taken as display objects, such as, for example, thumbnail images for still images and moving images, GUI components, application windows, still images and moving images where it is possible to display display objects within a display region.

Moreover, a description is given in this specification mainly centered on the addition, deletion and moving of display objects to and from display regions. However, at least one aspect of the present invention may also be applied to various other user operations that result in changes in the occupancy percentage and packing (density) of displayed objects in a display region. The present invention may also be applied to cases where operations for enlarging/compressing specific objects and operations for changing the size of display regions are carried out as user operations, such as with a Zooming Interface.

Further, in the present specification a description is given of an example of use where all displayed objects are scaled uniformly, but the essence of the present invention is by no means limited in this respect. For example, display control is also possible where the effective scale is changed for displayed objects to which appropriate scales and weightings have been assigned according to the priority of each of the displayed objects.

Although not referred to in the above embodiments, it is possible to provide a lower limit for the scale so as to limit the reduction of the size of displayed objects so as not to exceed this when the scale falls below a fixed scale. In this case, it is possible to add scrolling means such as a slide bar without enlarging the size of the display region or the apparent size of the display region and then carry out substitution processing such as enlarging the substantial size of the display region. With this configuration, the present invention can be considered to be effective in applications demanding visibility of displayed objects, such as, for example, electronic photograph albums, and thumbnail image displays for software.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for displaying objects in an information space on a screen, the screen having a total area, the method comprising:
    arranging an operating window on the screen, the operating window containing an initial number of display objects;
    accepting user operations at the screen;
    processing at least one of the operating window and the display objects within the operating window according to the user operations, the processing of the operating window resulting in the operating window having an area occupying a percentage of the total area of the screen, and the processing of the display objects resulting in the display objects having a total area occupying a percentage of the area of the operating window; and
    controlling the display of the operating window and the display objects on the screen, the display of the operating window being based on the percentage of the total area of the screen occupied by the operating window and the display of the display objects being based on the percentage of the area of the operating window occupied by the display objects.

2. The displaying method as claimed in claim 1, wherein the display objects are selected from the group consisting of icons and thumbnails symbolizing files and directories of file sets.

3. The displaying method as claimed in claim 1, further comprising:
    providing a hierarchical directory structure in which a directory is correlated with lower order files and directories; and
    allotting the total area of the screen to a root directory, wherein the operating window corresponds to a closest upper order directory and contains display objects of the lower order files and directories.

4. The displaying method as claimed in claim 1, wherein the step of processing the operating window includes at least one of adding an operating window to the screen, deleting an operating window from the screen, and changing a size of the operating window, and the step of processing the display objects includes at least one of adding display objects to an operating window, deleting display objects from an operating window, and moving display objects between operating windows.

5. The displaying method as claimed in claim 1, wherein the display control step includes recalculating the total area of the display objects within the operating window in response to an increase or a decrease in the number of display objects contained within the operating window, and adjusting a size of each display object within the operating window so that the percentage of the area of the operating window occupied by the display objects is a fixed value or less.

6. The displaying method as claimed in claim 5, wherein the step of processing the display objects includes adding a display object to the operating window, and, when the percentage of the area of the operating window occupied by the display objects exceeds the fixed value, the display control step includes reducing the size of each display object within the operating window so that the percentage of the area of the operating window occupied by the display objects is a predetermined value or less.

7. The displaying method as claimed in claim 5, wherein the display control step includes adjusting the percentage of the area of the operating window occupied by the display objects so that a scale of the display objects does not exceed a range of one.

8. The displaying method as claimed in claim 5, wherein the display control step further comprises setting at least one of an upper limit value and a lower limit value for the percentage of the area of the operating window occupied by the display objects.

9. The displaying method as claimed in claim 5, wherein the display control step further comprises setting at least one of an upper limit value and a lower limit value for a size of each display object.

10. The displaying method as claimed in claim 1, wherein
    the step of processing the display objects includes changing a size of a selected one of the display objects according to a change in importance of the selected display object, a user operation, or another event; and
    the display control step includes recalculating the total area of the display objects within the operating window according to the change in size of the selected display object, and adjusting a size of each display object so that the percentage of the area of the operating window occupied by the display objects is a fixed value or less.

11. The displaying method as claimed in claim 1, wherein the display control step further comprises causing a repulsion force to act between the display objects so that, when a new display object is added to an operating window, the display objects move to respective display positions in which each display object does not overlap with another display object.

12. The displaying method as claimed in claim 1, wherein the display control step includes recalculating a total area of the operating windows on the screen according to an increase or a reduction in a number of operating windows on the screen, and adjusting a size of each operating window so that the percentage of the total area of the screen occupied by the operating windows is a fixed value or less.

13. The displaying method as claimed in claim 12, wherein, when a new operating window is added to the screen or the size of an operating window is enlarged so that the percentage of the total area of the screen occupied by the operating windows exceeds the fixed value, the display control step includes reducing the size of the operating windows so that the percentage of the total area of the screen occupied by the operating windows is a predetermined value or less.

14. The displaying method as claimed in claim 13, wherein the display control step includes adjusting the percentage of the total area of the screen occupied by the operating window so that a scale of the operating window does not exceed a range of one.

15. The displaying method as claimed in claim 12, wherein
the step of processing the operating window includes changing a size of a specific operating window according to a change in importance of the specific operating window, a user operation, or another event; and
the display control step includes recalculating the total area of the operating windows on the screen according to the change in size of the specific operating window on the screen, and adjusting the size of other operating windows so that the percentage of the total area of the screen occupied by the operating windows is a fixed value or less.

16. The displaying method as claimed in claim 12, wherein the display control step further comprises setting at least one of an upper limit value and a lower limit value for the percentage of the total area of the screen occupied by the operating windows.

17. The displaying method as claimed in claim 12, wherein the display control step further comprises setting at least one of an upper limit value and a lower limit value for a size of each operating window.

18. The displaying method as claimed in claim 12, wherein the display control step further comprises causing a repulsion force to act between the operating windows so that, when a new operating window is added to the screen, the operating windows move to respective display positions in which each operating window does not overlap with another operating window.

19. A method for displaying objects in an information space on a screen, the screen having a total area, the method comprising:
arranging an initial number of operating windows on the screen, each operating window having a size and containing an initial number of display objects, each display object having a size;
accepting user operations at the screen;
processing at least one of the operating windows and the display objects within the operating windows according to the user operations, the processing of the operating windows resulting in the display of more or less operating windows on the screen than the initial number of operating windows, and the processing of the display objects resulting in the display of more or less display objects in at least one of the operating windows than the initial number of display objects; and
controlling the display of the operating windows and the display objects on the screen, the display of the operating windows including recalculating the sizes of the operating windows on the screen when the processing of the operating windows results in the addition of at least one operating window to the screen or the deletion of at least one operating window from the screen, and the display of the display objects including recalculating the sizes of the display objects in at least one of the operating windows when the processing of the display objects results in the addition of display objects to the at least one operating window or the deletion of display objects from the at least one operating window.

20. The displaying method as claimed in claim 19, wherein the display control step includes controlling a percentage of the total area of the screen occupied by the operating windows to be within a fixed size range and controlling a percentage of an area of the operating window occupied by the display objects to be within a fixed size range.

21. A device for displaying objects in an information space on a screen, the screen having a total area, the device comprising:
an operating window on the screen, the operating window containing an initial number of display objects;
a user input unit operable to accept user operations at the screen;
a processing unit operable to process at least one of the operating window and the display objects within the operating window according to the user operations, the processing of the operating window resulting in the operating window having an area occupying a percentage of the total area of the screen, and the processing of the display objects resulting in the display objects having a total area occupying a percentage of the area of the operating window; and
a display control unit operable to control the display of at least one of the operating window and the display objects on the screen, the display of the operating window being based on the percentage of the total area of the screen occupied by the operating window and the display of the display objects being based on the percentage of the area of the operating window occupied by the display objects.

22. A device for displaying objects in an information space on a screen, the screen having a total area, the device comprising:
an initial number of operating windows arranged on the screen, each operating window having a size and containing an initial number of display objects, each display object having a size;
a user input unit operable to accept user operations at the screen;
a processing unit operable to process at least one of the operating windows and the display objects within the operating windows according to the user operations, the processing of the operating windows resulting in the display of more or less operating windows on the screen than the initial number of operating windows, and the processing of the display objects resulting in the display of more or less display objects in at least one of the operating windows than the initial number of display objects; and
a display control unit for controlling the display of the operating windows and the display objects on the screen, the display of the operating windows including recalculating the sizes of the operating windows on the screen when the processing of the operating windows results in the addition of at least one operating window to the screen or the deletion of at least one operating window from the screen, and the display of the display objects including recalculating the sizes of the display objects in at least one of the operating windows when the processing of the display objects results in the addition of display objects to the at least one operating window or the deletion of display objects from the at least one operating window.

23. A computer-readable medium recorded with a computer program for executing a process for displaying objects in an information space on a screen, the screen having a total area, the process comprising:

arranging an operating window on the screen, the operating window containing an initial number of display objects; accepting user operations at the screen; processing at least one of the operating window and the display objects within the operating window according to the user operations, the processing of the operating window resulting in the operating window having an area occupying a percentage of the total area of the screen, and the processing of the display objects resulting in the display objects having a total area occupying a percentage of the area of the operating window; and controlling the display of the operating window and the display objects on the screen, the display of the operating window being based on the percentage of the total area of the screen occupied by the operating window and the display of the display objects being based on the percentage of the area of the operating window occupied by the display objects.

24. A computer-readable medium recorded with a computer program for executing a process for displaying objects in an information space on a screen, the screen having a total area, the process comprising:

arranging an initial number of operating windows on the screen, each operating window having a size and containing an initial number of display objects, each display object having a size; accepting user operations at the screen; processing at least one of the operating windows and the display objects within the operating windows according to the user operations, the processing of the operating windows resulting in the display of more or less operating windows on the screen than the initial number of operating windows, and the processing of the display objects resulting in the display of more or less display objects in at least one of the operating windows than the initial number of display objects; and controlling the display of the operating windows and the display objects on the screen, the display of the operating windows including recalculating the sizes of the operating windows on the screen when the processing of the operating windows results in the addition of at least one operating window to the screen or the deletion of at least one operating window from the screen, and the display of the display objects including recalculating the sizes of the display objects in at least one of the operating windows when the processing of the display objects results in the addition of display objects to the at least one operating window or the deletion of display objects from the at least one operating window.

* * * * *